(12) United States Patent
Wang et al.

(10) Patent No.: US 6,317,200 B1
(45) Date of Patent: Nov. 13, 2001

(54) POSITIONAL MEASUREMENT WITH NORMALIZED SIGNAL PROCESSING

(75) Inventors: Mao Wang, Sunnyvale; John C. Tsai, Saratoga, both of CA (US)

(73) Assignee: Excel Precision Corp., Santa Clara, CA (US)

( * ) Notice: Subject to any disclaimer, the term of this patent is extended or adjusted under 35 U.S.C. 154(b) by 0 days.

(21) Appl. No.: 09/548,918

(22) Filed: Apr. 13, 2000

(Under 37 CFR 1.47)

Related U.S. Application Data
(60) Provisional application No. 60/129,142, filed on Apr. 13, 1999.

(51) Int. Cl.[7] .......................................... G01C 3/08
(52) U.S. Cl. ...................... 356/4.07; 356/4.01; 356/3.04; 356/3.06; 356/493; 250/214 B
(58) Field of Search ..................... 356/3.04, 3.06, 356/4.01, 4.07, 493

(56) References Cited

U.S. PATENT DOCUMENTS

| | | | |
|---|---|---|---|
| 4,419,012 | * 12/1983 | Stephenson et al. | 356/141 |
| 4,770,530 | * 9/1988 | Van Aken et al. | 356/323 |
| 5,033,856 | * 7/1991 | Nose et al. | 356/376 |
| 5,272,351 | * 12/1993 | Andressen | 250/561 |
| 5,291,263 | * 3/1994 | Kong | 356/5 |
| 5,801,817 | * 9/1998 | Riedel | 356/4.07 |
| 5,847,815 | * 12/1998 | Albouy et al. | 356/4.01 |
| 6,200,441 | * 3/2001 | Gornicki et al. | 204/298.25 |

* cited by examiner

Primary Examiner—Thomas H. Tarcza
Assistant Examiner—Brian Andrea
(74) Attorney, Agent, or Firm—Oppenheimer Wolff & Donnelly, LLP; Raymond E. Roberts

(57) ABSTRACT

A measurement apparatus (10, 110) and methods to perform positional types of measurement with normalization respective to either or both of light beam (16, 116) intensity and measurement target (12, 112) reflectivity. A light source, such as a laser diode (14, 114), produces a light beam (16, 116) which is directed at the measurement target (12, 112). One or more beamsplitters (28, 120, 124) in the path of the light beam (16, 116) direct sample portions into one or more photodetectors (32, 36, 122, 128) to obtain either or both of illumination and reflectivity sample values. A portion of the light beam (16, 116) which is reflected by the measurement target (12, 112) is passed through and restricted by an aperture (26, 132) and then detected by a position sensitive detector (38, 134) to obtain a position value. The position value may then be normalized based on either or both of the illumination and reflectivity sample values.

26 Claims, 3 Drawing Sheets ary to build a housing to totally insulate them. This process is commonly done in research laboratories, but it is often not practical in an industrial environment.

POSITIONAL MEASUREMENT WITH NORMALIZED SIGNAL PROCESSING

CROSS-REFERENCE TO RELATED APPLICATIONS

This application claims the benefit of U.S. Provisional Application No. 60/129,142, filed Apr. 13, 1999.

TECHNICAL FIELD

The present invention relates generally to optical measurement, and more particularly to techniques for normalizing such measurements with respect to light intensity fluxuation and variation in measurement target reflectivity. It is anticipated that this invention will be used widely with laser light sources, particularly including laser diode light sources, but this is not necessarily a requirement and measurement techniques using other types of light sources may also benefit from use of the invention.

BACKGROUND ART

Optical measurement techniques are in wide use today in many industries. In addition to not requiring physical contact, such techniques may produce very accurate measurements. However, as with almost all tools, it is desirable to still further improve upon and develop new optical measurement techniques.

FIG. 1 (background art) is schematic block diagram depicting the conventional optical triangulation method of position detection. In this technique, a light source and a detector are positioned in a fixed relationship. A measurement target is placed in the path of a light beam produced by the light source, and this the light source, the detector, and the target form a triangle. The light beam shines on the target and is reflected back by the target to the detector. The distribution of reflected intensity on the detector, is measured and the angle of the target is calculated. Since the distance between the light source and the detector is fixed and the light beam direction is also fixed, the position of the target can then be calculated.

Unfortunately this simple triangulation technique suffers from a number of disadvantages. The light source, the detector, and the direction of motion of the measurement target (+/−Y direction) all have to be in the same plane. This means that the triangulation technique here can only measure in one degree of freedom, and this approach cannot be used to tell whether the target is moving longitudinally or laterally (+/−X or Z directions).

Of particular present interest, the triangulation technique does not address variations in the light used for measurement. Stabilizing the intensity from the light source or compensating for fluxuations in the light are not provided for here, and either or both may be desirable when high measurement precision is needed. The light reaching the detector may also be effected by conditions elsewhere than at its source. For example, target reflectivity may vary, particularly if different areas of a target are used for reflection at different points in measurement. Various factors can also effect the light path itself, rather than its triangle endpoints, such as air turbulence, the presence of particulate matter, etc.

These light variation factors also exacerbate other inherent problems with the triangulation technique. The level of sophistication in calculation required to determine the target position is high, and this also limits triangulation technique based system response times.

Lasers are widely used today in optical measurement, and in FIG. 1 a laser diode is depicted as being the light source. Although other types of lasers and even other light sources entirely may be used, laser diodes are becoming very popular for remote sensing due to their low cost, small physical dimensions, and high sensitivity. A problem with light sources and a particularly acute one for laser diodes is the effect of power variation on the stability of light beam intensity. The usual manner to address this problem is to design power stabilizing circuitry, but this may be unduly expensive in some cases and simply insufficient in others.

Mere light source power stabilization may also be ineffective, even with very closely controlled power stabilization. Laser diodes very in sensitivity based on the environmental temperature. Thus it often becomes necessary to build a housing to totally insulate them. This process is commonly done in research laboratories, but it is often not practical in an industrial environment.

Light source stabilization may be important but, as experienced engineers well know, merely applying correction does not mean that one can rely on it to occur in the manner and to the extent desired. Thus, even when stabilizing techniques are employed, it is highly desirable to also be able to verify their effectiveness.

In FIG. 1 a position sensitive type detector is depicted, such as a simple photo diode, but other detectors types may also be used, such as bi-cell detectors, quadrant detectors, and photodiode detector arrays. The detector used for optical measurement is usually the most stable and trustable component, and a detailed discussion of detectors is not germane to the present invention. Rather, our concern here is improving the art of optical measurement in the stages before the detector and to effectively verify that improvement.

FIG. 1 shows only the conventional triangulation method, wherein a light beam travels one path to the target and another from it to the detector. This geometry is useful in many situations, but not in all. For example, it may desirable to employ reflection but at normal angles, such that a light beam travels substantially the same path to and from the target to the detector. Or to even employ a linear arrangement, wherein the source, target, and detector form a line.

Accordingly, new and improved techniques of optical measurement are highly desirable and should be promptly and well received.

DISCLOSURE OF INVENTION

Accordingly, it is an object of the present invention to provide optical measurement techniques of high accuracy and reliability.

Another object of the invention is to provide optical measurement techniques which normalize the intensity of the light used for measurement.

Another object of the invention is to provide optical measurement techniques which normalize for non-source related effects in the light used for measurement.

And another object of the invention is to provide optical measurement techniques which flexibly may be used in various component and target geometric arrangements.

Briefly, one preferred embodiment of the present invention is an apparatus for measuring the position of a measurement target. The apparatus includes a light source for producing a light beam and directing at least a portion of it toward the measurement target, which then reflects it back.

A beamsplitter is placed to receive the light beam and to split it into a sample portion and a main portion. A photodetector is placed to receive the sample portion, for the purpose of obtaining a sample value. An opaque plate having an aperture is also present, and is placed to receive the main portion but pass only a sub-portion of it through the aperture as a position portion that may be used for detecting the position of the measurement target. A position sensitive detector is further present, to receive the position portion and to obtain from it a positional value. The sample value is useful to normalize this positional value.

Different types of normalization are possible in different embodiments of the invention, depending upon where the beamsplitter is placed and where the sample portion of the light beam is taken from. In one set of embodiments, the beamsplitter is placed to receive the light beam before it reaches the measurement target, and the normalization of the positional value may then be with respect to the intensity of the light beam. In another set of embodiments, the beamsplitter is placed to receive the light beam after it has been reflected from the measurement target, and the normalization of the positional value then may be with respect to the reflectivity of the measurement target. In yet another set of embodiments, sample portions can be taken from the light beam both before and after the measurement target. These two sample portions are then detected with two photodetectors, and both intensity and reflectivity normalization can be accomplished. A sub-set of this set of embodiments is particularly advantageous in that it requires only one beamsplitter for obtaining the two sample portions, yet further permits directing the light beam normal to the measurement target, rather than in the conventional triangular manner.

An advantage of the present invention is that it does permit highly accurate, reliable, and geometrically flexible optical measurements wherein the light intensity, path transmitivity, and target reflectivity may all or in part be normalized.

Another advantage of the invention is that it compensates for intensity fluxuation in the light used, rather than or in addition to stabilizing for the intensity of the light used.

Another advantage of the invention is that it inherently provides trustworthy measurement because it detects the effects of the actual conditions present and permits correcting for those.

And another advantage of the invention is that it may provide very fast responsiveness, permitting faster measurements and rapid detection and correction of factors which may effect measurement.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
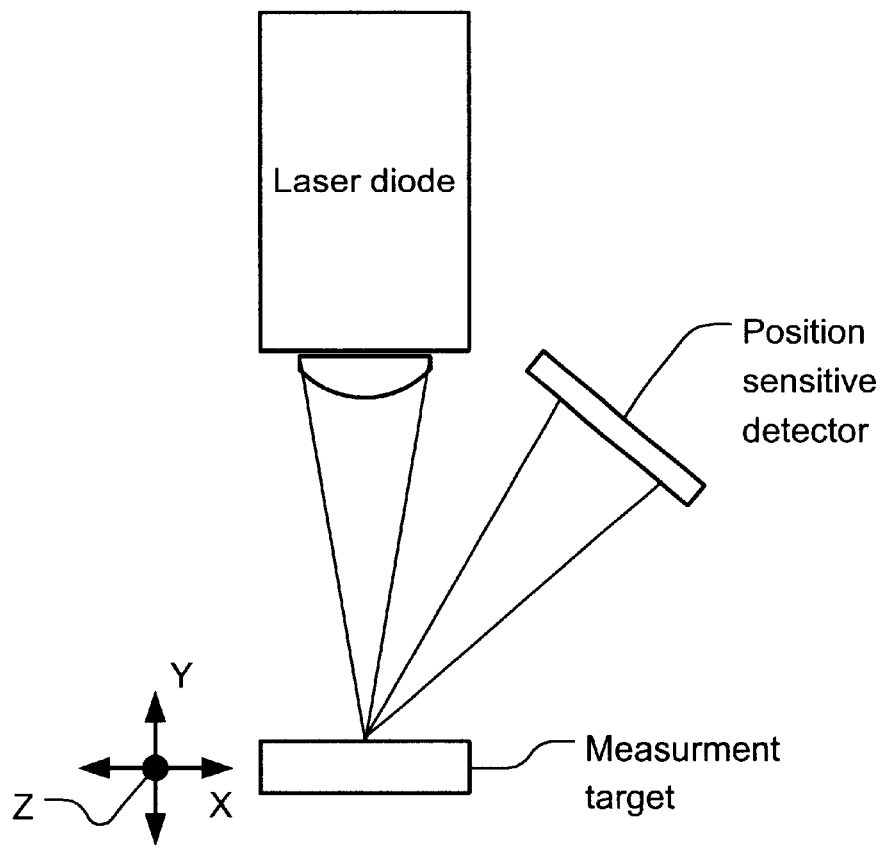
FIG. 1 (background art) is schematic block diagram depicting the conventional triangulation method of position detection.
Figure 2:
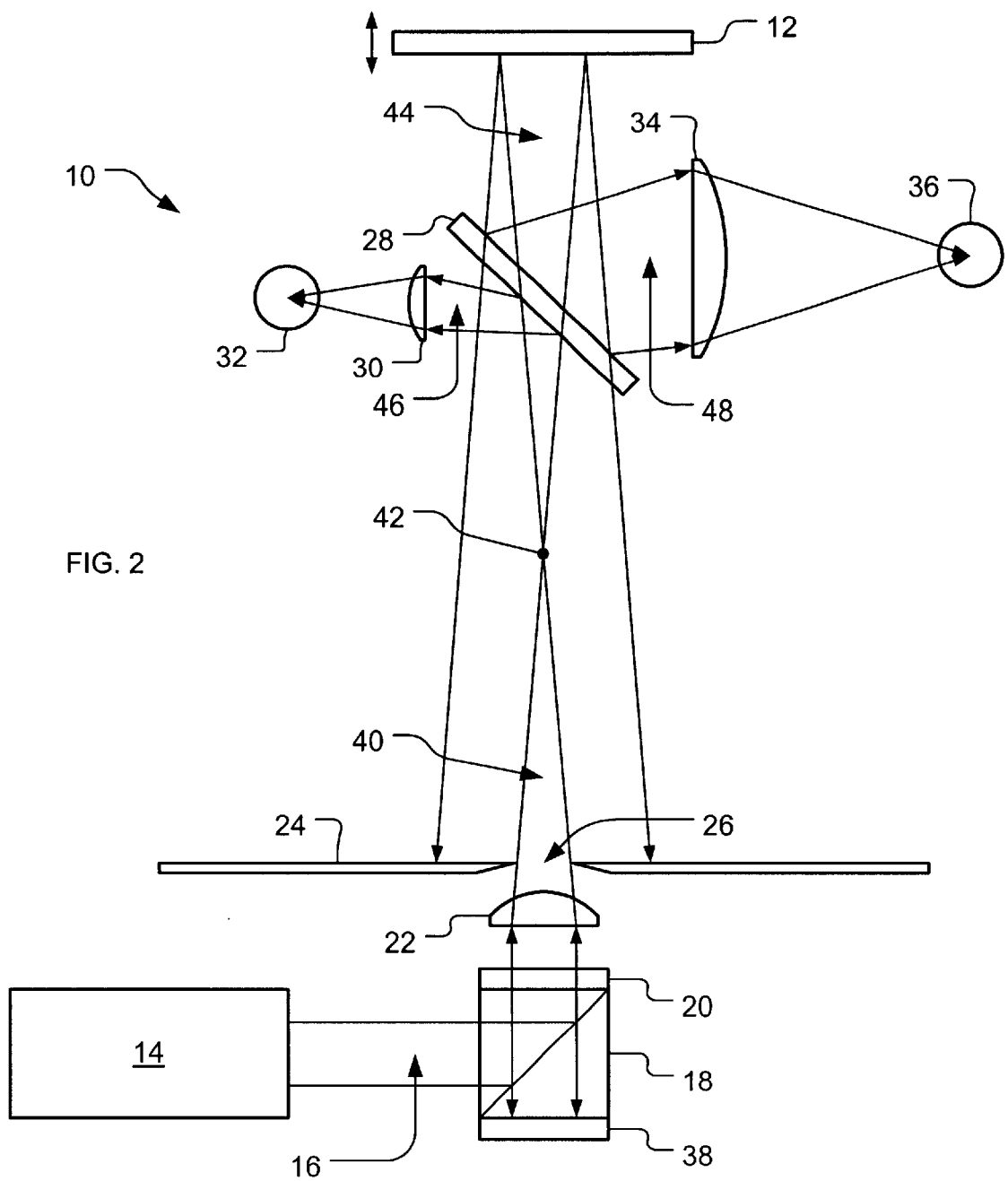
FIG. 2 is a schematic block diagram depicting an embodiment of the present invention which folds the measurement beam onto the same axis and permits both illumination and reflectivity normalization.

A preferred embodiment of the present invention is a measurement apparatus for determining positional characteristics of a target such as a work piece or tool surface used in manufacturing. FIG. 2 particularly illustrates a primary preferred embodiment of the invention, with the invention therein depicted by the general reference character 10. A generic measurement target is also depicted by the general reference character 12.

FIG. 2 is a schematic block diagram depicting how the primary preferred embodiment of the inventive measurement apparatus 10 includes a laser diode 14 which produces a light beam 16; a polarized beamsplitter 18 for directing the light beam 16 based upon its polarization; a quarter-wave plate 20 for altering the polarization of the light beam 16; a primary focusing lens 22; a plate 24 having an aperture 26; a simple beamsplitter 28 for providing samples from the light beam 16, one each as it passes and re-passes; a first detector lens 30; a first photo detector 32; a second detector lens 34; a second photo detector 36; and a position sensitive detector 38.

The laser diode 14 is suitably oriented to provide the light beam 16 such that the polarized beamsplitter 18 receives and redirects it due to its initial polarization. This is an "initial" 0 pass of the light beam 16 through the polarized beamsplitter 18, and in this embodiment there is a also a later "final" pass, described below.

Upon leaving the polarized beamsplitter 18, the light beam 16 passes through the quarter-wave plate 20, where its polarization is changed. The light beam 16 then is collected by the primary focusing lens 22 and focused such that it has a converging portion 40 which passes through the aperture 26 and ends at a focal point 42. The light beam 16 further has a diverging portion 44, beginning at the focal point 42.

The simple beamsplitter 28 is placed in the path of the light beam 16 such that in the initial pass an illumination sample portion 46 is directed into the first detector lens 30, which in turn focuses it onto the first photo detector 32. The first photo detector 32 is then able to detect an illumination intensity value ($I_1$) and communicate that to a control system (not shown). The remainder of the light beam 16 passes through the simple beamsplitter 28 and travels onward to the target 12 having its position being measured.

In the particular embodiment depicted in FIG. 2, the path of the light beam 16 as it is reflected back by the target 12 is in many respects opposite that already taken. The light beam 16 is reflected back into the simple beamsplitter 28, where a reflectivity sample portion 48 is now directed into the second detector lens 34 and focused onto the second photo detector 36, such that a reflectivity intensity value ($I_2$) may be detected and also communicated to the control system.

The remainder of the light beam 16 passes through the simple beamsplitter 28 and travels back toward the aperture 26. However, a key feature is that the light beam 16 is now larger than the aperture 26 due to divergence, and not all of it is able to pass through the aperture 26 now. The portion of the light beam 16 which does pass the aperture 26 travels through the primary focusing lens 22 and through the quarter-wave plate 20, where its polarization is further changed.

Upon entering the polarized beamsplitter 18 in this, the final pass, the light beam 16 has a polarization which has been changed such that it is now able to pass rather than being redirected as before. The light beam 16 therefore travels to the position sensitive detector 38, where a final intensity value ($I_3$) and optional positional information may be detected and communicated to the control system.

Due to the diverging nature of the light beam 16, the final intensity value ($I_3$) obtained in this manner is proportional to the location of the target 12 having its position measured. This follows conventional principles of physics (the inverse-square law). The particular novelty of the inventive measurement apparatus 10 lies in the particular structure used to obtain the other intensity values ($I_1$ and $I_2$), and the particular benefits of what can be done with the intensity values ($I_1$, $I_2$, and $I_3$) in combination.

Any variation in the intensity of a light beam before it reaches a target correspondingly effects the intensity of what is reflected back from that target, and this can seriously degrade measurement accuracy. The invention overcomes this problem using the illumination intensity value ($I_1$), which is measured during the initial pass of the light beam 16 on its way to the target 12. By taking the ratio of this and the final intensity value ($I_3$), any measurement uncertainty due to variation in illumination intensity is essentially eliminated. This benefit can be termed "illumination normalization."

The reflectivity of a target effects the intensity of a light beam being reflected back from that target. If there is variation across a single target, or variations between different targets, this can also seriously degrade measurement accuracy. The invention overcomes this problem using the reflectivity intensity value ($I_2$), which is measured during the final pass of the light beam 16 as it is reflected back from the target 12. By taking the ratio of this and the final intensity value ($I_3$), measurement uncertainty due to variations in reflectivity is considerably reduced. This benefit can be termed "reflectivity normalization."

While somewhat subtle, this reflectivity normalization method can be appreciated by keeping in mind that the reflectivity intensity value ($I_2$) is proportional to reflection from the target 12, while the final intensity value ($I_3$) is based on only the portion of the light beam 16 which passes back through the aperture 26. The aperture 26 insures that a uniformly sized portion of the light beam 16 reaches the position sensitive detector 38. The use of an appropriately sized aperture 26 therefore is a key feature of the invention.

Figure 3:
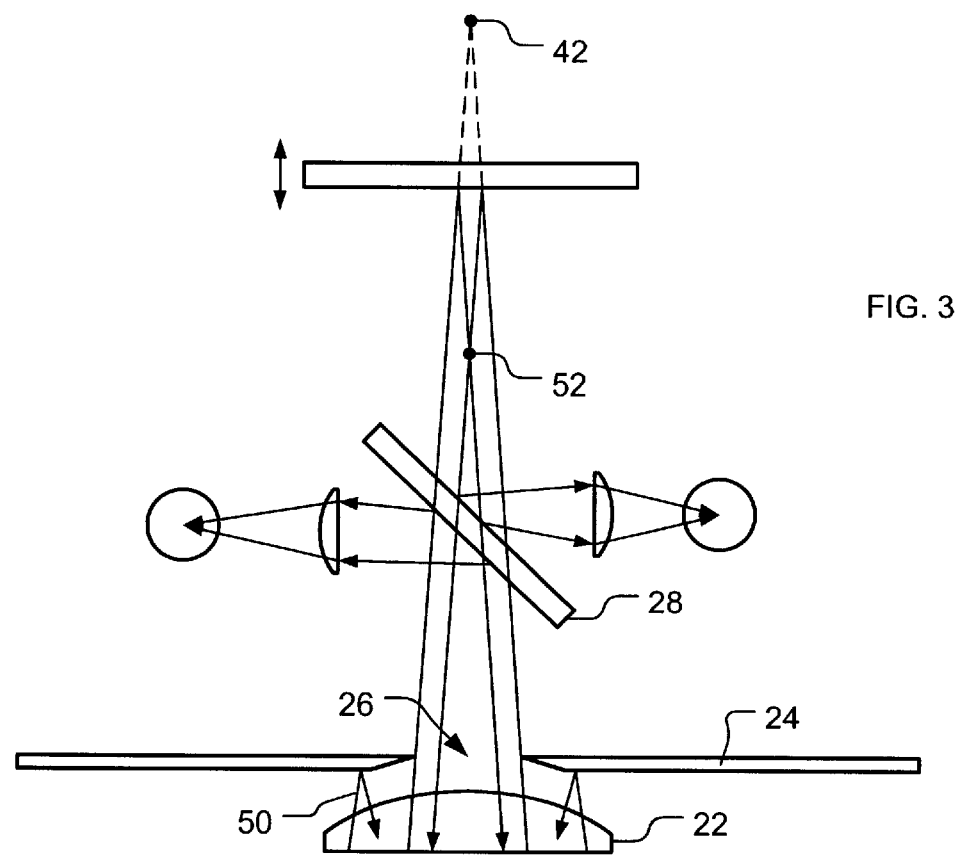
FIG. 3 is a schematic block diagram depicting some of the components of the embodiment of FIG. 2 alternately arranged.

In FIG. 2 the normalization components are all placed "beyond" the focal point 42, but this is not a requirement, and those skilled in the relevant arts will readily appreciate that embodiments of the invention can be made with the normalization components placed "before" the focal point 42 (see e.g., FIG. 3).

The location of the normalization components depicted in FIG. 2 is a practical compromise with regard to the conflicting design goals of providing a wide range of locations for the target 12 where positional measurement is practical, yet also limiting component size. If the normalization components are instead placed before the focal point 42, the usable target 12 range is increased, but so are at least some of the component sizes, e.g., the simple beamsplitter 28 and second detector lens 34. This is because the further the target 12 is away from the simple beamsplitter 28 on the final pass, the more the reflected light beam 16 diverges. Yet the normalization components must be large enough to collect all of the reflected light beam 16 if both a truly representative reflectivity sample portion 48 and a non-corrupted final intensity ($I_3$) are to be obtained.

FIG. 3 is a schematic block diagram partially depicting the embodiment of FIG. 2, but with a number of the components arranged somewhat differently. The reference numbers of FIG. 2 are reused in FIG. 3 to facilitate comparison. The normalization components here are placed before the normal focal point 42 (which is shown in ghost form here). This imposes no particular detriment in measurement, and quite suitable alternate embodiments of the invention may be constructed this way. In contrast, there are two other changes depicted here which do produce what will often be considered detrimental results.

The choice or placement of either or both of the primary focusing lens 22 and the aperture 26 is here shown causing a peripheral portion of the light beam 16 to be reflected from the surface of the plate 24 around the aperture 26. This is depicted by arrowed lines 50. Unless there is some particular reason to eliminate this part of the light beam 16, this is generally not desirable. It is usually better practice to efficiently use the available light energy and to at least not "waste" any of it where it can cause undesirable thermal effects. Further, as the directions of the arrowed lines 50 imply, spurious surface reflections produced in this manner may even reach the position sensitive detector 38 (FIG. 2) and degrade the accuracy of the ultimate positional measurements being made.

The other arrangement illustrated in FIG. 3 which is generally considered detrimental is having a target 12 appear before the natural focal point 42. Reflection then produces a new focal point 52, but the reflected light beam 16 is now smaller than the opening when it re-passes through the aperture 26. The cross-section of the reflected light beam 16 which reaches the position sensitive detector 38 thus becomes a second variable, one which at the very least severely complicates measurement by degrading the final intensity value ($I_3$). Correction for this may be achieved using sophisticated position sensitive detector hardware and appropriate processing, but such will be unnecessarily complex for most needs.

Those skilled in the relevant arts will also appreciate that a no-focal-point embodiment may also work, e.g., one where the surface of the target 12 is concave. But the opportunities for embodiments dictated by target shape are limited, and the degree of curvature of the target 12 may still not be enough.

Figure 4:
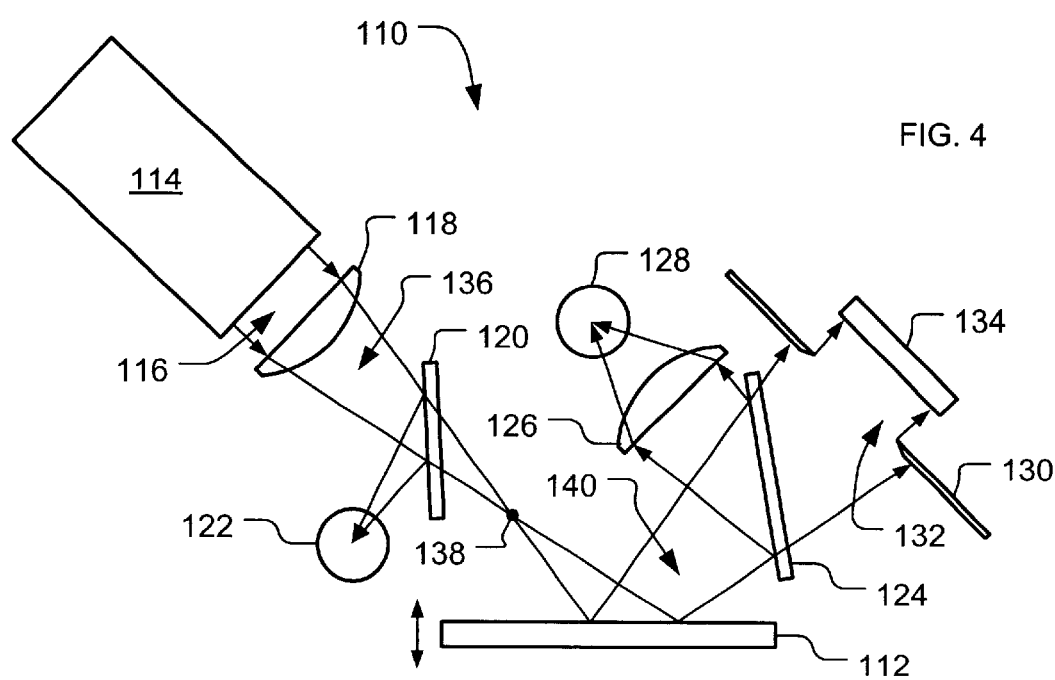
FIG. 4 is a schematic block diagram depicting an alternate embodiment of the present invention using the triangulation technique, yet also permitting both illumination and reflectivity normalization.

FIG. 4 illustrates an alternate preferred embodiment of the invention, one with the invention therein depicted by the general reference character 110. A generic measurement target is also depicted by the general reference character 112.

FIG. 4 is a schematic block diagram depicting how the alternate preferred embodiment of the inventive measurement apparatus 110 includes a laser diode 114 which produces a light beam 116; a primary focusing lens 118; a first simple beamsplitter 120; a first photo detector 122; a second simple beamsplitter 124; a detector lens 126; a second photo detector 128; a plate 130 having an aperture 132; and a position sensitive detector 134. Some notable distinctions from the embodiment of FIG. 2 are that the polarized beamsplitter 18, the quarter-wave plate 20, and the first detector lens 30 are not used. Furthermore, the function of the simple beamsplitter 28 is now divided and performed by the first simple beamsplitter 120 and the second simple beamsplitter 124.

The laser diode 114 provides the light beam 116 for collection and focusing by the primary focusing lens 118, such that it has a converging portion 136, ending at a focal point 138, and a diverging portion 140, beginning at the focal point 138.

The first simple beamsplitter 120 is placed in the path of the light beam 116 such that an illumination sample portion 142 is directed into the first photo detector 122. The first photo detector 122 is thus able to detect an illumination intensity value ($I_1$). The remainder of the light beam 116 then travels onward to the target 112 having its position being measured. Alternately, either a convex or concave lens, as needed, can be added to focus the illumination sample portion 142 onto the first photo detector 122. But by placement of the first simple beamsplitter 120 in the converging portion 136 of the light beam 116 and also using focal point placement of the first photo detector 122, as illustrated here, such a lens is unnecessary.

At the target 112 the light beam 116 is reflected onward into the second simple beamsplitter 124. A reflectivity sample portion 144 is now directed into the detector lens 126 and focused onto the second photo detector 128, such that a reflectivity intensity value ($I_2$) may be detected. Alternately, by moving the focal point 138 beyond the second simple beamsplitter 124, the detector lens 126 can also be eliminated. This becomes possible by arranging to have the first simple beamsplitter 120 and the second simple beamsplitter 124 in the converging portion 136 of the light beam 116, and by also using focal point placements for the first photo detector 122 and the second photo detector 128. However, most such embodiments will probably have component dimensions larger than generally desirable.

The remainder of the light beam 116 passes through the second simple beamsplitter 124 and travels onward toward the aperture 132. The portion of the light beam 116 which passes the aperture 132 travels to the position sensitive detector 134, where a final intensity value ($I_3$) and optional positional information may be detected. In this embodiment, combinations of the collected intensity values ($I_1$, $I_2$, and $I_3$) also permit highly accurate positional measurement of the location of the target 112.

The invention, with any of the embodiments discussed herein, may also be used to detect optional positional information in addition to the intensity values. Such "optional positional information" herein means more than mere target distance. By use of more complex devices than single photodiode type photo detectors, position data for more than one dimension may be derived. Some examples of such more complex devices include, without limitation, bi-cell detectors and linear photocell arrays. These permit detection of target movement and even specific target feature measurement in one additional dimension, i.e. additional to mere linear distance from the position sensitive detector 134. And by using quadrant detectors or photocell grids movement and feature measurement in a plane is possible, also in addition to distance measurement.

More than simple static location measurements can also be obtained using the invention. Suitable interpretation of the information provided by the invention with respect to time permits both target speed and acceleration measurements to be made, and this can additionally be done with respect to one or more of the positional dimensions.

While various embodiments of the inventive measurement apparatus 10, 110 have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

Industrial Applicability

The present measurement apparatus 10, 110 is well suited for application in industrial and laboratory measurement both as presently practiced and as reasonably anticipated to be needed soon. Optical techniques are widely and increasingly used today to obtain accurate measurements. In industry such techniques are used extensively, for example, in semiconductor and computer storage device manufacture. In laboratories such techniques are also used extensively, both in developing new techniques for industry and for basic research purposes. Currently, optical measurement capabilities are, in some key respects, at the limits possible with prior art techniques and new and improved techniques are much sought.

The present invention improves optical measurement techniques in two distinct respects which also may be advantageously combined. The measurement apparatus 10, 110 may be used to normalize with respect to either light intensity or measurement target reflectivity, or both concurrently.

The preferred light source for optical measurement today is the laser, particularly the laser diode. Lasers provide light generally having excellent characteristics for use in optical measurement, and laser diodes are economical and can meet safety requirements which permit their wide use. Unfortunately lasers, laser diodes, and many other light sources as well, are all subject to light intensity variation. Various factors are responsible for this, including power supply variation, internal thermal effects, operating environment influences on the light source, and influences on the beam path after light leaves the light source. While the various factors present can sometimes be controlled, such is not always possible and is often too difficult or expensive to be practical. Accordingly, it is highly desirable to be able to compensate for intensity variation, regardless of the factors creating it. For particularly precise measurement it is also desirable to be able to compensate even after stabilization efforts are made. The ability of the present measurement apparatus 10, 110 to normalize with respect to the intensity of a light beam being used in positional measurement is therefore highly benifical.

Another area of concern in optical measurement techniques is measurement target reflectivity. If a plurality of measurement targets are employed, say, in a manufacturing scenario as work pieces, it is simply not practical to provide for consistent reflectivity between the various targets. Further, consistent reflectivity across the surface of the same target may also be difficult or impossible too achieve. As with fluxuation in light intensity, variation in target reflectivity degrades positional optical measurement. The ability of the measurement apparatus 10, 110 to normalize with respect to target reflectivity in positional measurement is therefore also highly useful.

The present invention is also easily and economically employable for both industrial and research needs. It may use components which are already well known and widely available. In particular it may use laser diodes which are both economical and safe. It may also use a wide variety of detectors, including simple photodiodes, bi-cell detectors, quadrant detectors, photodiode arrays, and yet other types, thus permitting use in the wide variety of usages where such are and can be employed. The optical components proper may include simple or polarized beamsplitters, quarter-wave plates (in embodiments using polarization to split and direct the light beams), and simple lenses. Accordingly, the component parts of the present invention are all or largely conventional and the invention may be implemented and employed immediately and with minimal disruption in existing measurement applications and with low cost to new measurement applications.

For the above, and other, reasons, it is expected that the measurement apparatus and methods of using such of the present invention will have widespread industrial applicability. Therefore, it is expected that the commercial utility of the present invention will be extensive and long lasting.

What is claimed is:

1. An apparatus for measuring the position of a measurement target, the apparatus comprising:
    a light source for producing a light beam;
    a first quarter-wave plate suitably placed to receive said light beam and to impart to it a desired first polarization;
    a first polarized beamsplitter suitably placed to receive and to redirect at least a portion of said light beam based on said first polarization toward the measurement target;
    a second quarter-wave plate suitably placed to receive said light beam and to impart to it a desired second polarization;
    a primary focusing lens suitably placed to receive and to focus said light beam to a focal point such that it has both a converging portion and a diverging portion;
    an opaque plate having an aperture, said plate being suitably placed to receive and to pass said converging portion through said aperture;
    a second non-polarized beamsplitter suitably placed to receive said light beam and to split it into an intensity sample portion and a target portion;
    a first detector focusing lens suitably placed to receive and to focus said intensity sample portion onto a first photodetector for detection of an intensity value;
    said second non-polarized beamsplitter being further suitably placed to receive said target portion when reflected from the measurement target and to split it into a reflectivity sample portion and a measurement portion;
    a second detector focusing lens suitably placed to receive and to focus said reflectivity sample portion onto a second photodetector for detection of a reflectivity value;
    said opaque plate being further suitably placed to receive said measurement portion and to pass a position portion through said aperture, such that said position portion is less in cross section than said measurement portion; and
    said second quarter-wave plate being further suitably placed to receive said position portion and to impart to it a desired third polarization; and
    said first polarized beamsplitter being further suitably placed to receive and to pass direct said position portion based on said third polarization onto a position sensitive detector for detection of a positional value, to permit use of said intensity value to normalize said positional value with respect to intensity of said light beam and use of said reflectivity value to normalize said positional value with respect to reflectivity of the measurement target.

2. An apparatus for measuring the position of a measurement target, the apparatus comprising:
    a light source for producing a light beam;
    a first beamsplitter suitably placed to receive and to direct at least a portion of said light beam toward the measurement target;
    a primary lens suitably placed to receive and to focus said light beam to a focal point such that it has both a converging portion and a diverging portion;
    an opaque plate having an aperture, said plate being suitably placed to receive and to pass said converging portion through said aperture;
    a second beamsplitter suitably placed to receive said light beam and to split it into an intensity sample portion and a target portion which passes to and is reflected from the measurement target as a measurement portion;
    a detector lens suitably placed to receive and to focus said intensity sample portion onto a photodetector for detection of an intensity value;
    said opaque plate being further suitably placed to receive said measurement portion and to pass a position portion through said aperture, such that said position portion is less in cross section than said measurement portion; and
    said first beamsplitter being further suitably placed to receive and to direct said position portion onto a position sensitive detector for detection of a positional value, to permit use of said intensity value to normalize said positional value with respect to intensity of said light beam.

3. The apparatus of claim 2, wherein said light source includes a laser diode.

4. The apparatus of claim 2, wherein:
    said light beam has a desired first polarization; and
    said first beamsplitter is a polarized type beamsplitter and said at least a portion of said light beam is directed based on said first polarization;
    and the apparatus further comprising:
        a return polarizer suitably placed to receive said at least a portion of light beam and to impart to it a desired second polarization such that said first beamsplitter directs said position portion onto said position sensitive detector based on said second polarization.

5. The apparatus of claim 4, wherein said return polarizer is a quarter-wave plate.

6. The apparatus of claim 4, wherein said light source includes a departure polarizer which imparts said desired first polarization to said light beam.

7. The apparatus of claim 6, wherein said departure polarizer is a quarter-wave plate.

8. The apparatus of claim 2, wherein said target portion and said measurement portion pass co-linearly and normally in relation to the measurement target.

9. The apparatus of claim 2, wherein said target portion and said measurement portion define two sides of a triangle and do not pass normally in relation to the measurement target.

10. The apparatus of claim 2, wherein said photodetector is a photo diode.

11. The apparatus of claim 2, wherein said photodetector is a member of the set consisting of bi-cell detectors, quadrant detectors, and photodiode detector arrays.

12. An apparatus for measuring the position of a measurement target, the apparatus comprising:

a light source for producing a light beam;

a first beamsplitter suitably placed to receive and to direct at least a portion of said light beam toward the measurement target;

a primary lens suitably placed to receive and to focus said light beam to a focal point such that it has both a converging portion and a diverging portion;

an opaque plate having an aperture, said plate being suitably placed to receive and to pass said converging portion through said aperture as a target portion which passes to and is reflected from the measurement target;

a second beamsplitter suitably placed to receive said target portion and to split it into a reflectivity sample portion and a measurement portion;

a detector lens suitably placed to receive and to focus said reflectivity sample portion onto a photodetector for detection of a reflectivity value;

said opaque plate being further suitably placed to receive said measurement portion and to pass a position portion through said aperture, such that said position portion is less in cross section than said measurement portion; and said first beamsplitter being further suitably placed to receive and to direct said position portion onto a position sensitive detector for detection of a positional value, to permit use of said reflectivity value to normalize said positional value with respect to reflectivity of the measurement target.

13. The apparatus of claim 12, wherein said light source includes a laser diode.

14. The apparatus of claim 12, wherein:

said light beam has a desired first polarization; and said first beamsplitter is a polarized type beamsplitter and said at least a portion of said light beam is directed based on said first polarization;

and the apparatus further comprising:

a return polarizer suitably placed to receive said at least a portion of light beam and to impart to it a desired second polarization such that said first beamsplitter directs said position portion onto said position sensitive detector based on said second polarization.

15. The apparatus of claim 12, wherein said return polarizer is a quarter-wave plate.

16. The apparatus of claim 12, wherein said light source includes a departure polarizer which imparts said desired first polarization to said light beam.

17. The apparatus of claim 16, wherein said departure polarizer is a quarter-wave plate.

18. The apparatus of claim 12, wherein said target portion and said measurement portion pass co-linearly and normal in relation to the measurement target.

19. The apparatus of claim 12, wherein said target portion and said measurement portion define two sides of a triangle and do not pass normal in relation to the measurement target.

20. The apparatus of claim 12, wherein said photodetector is a photo diode.

21. The apparatus of claim 12, wherein said photodetector is a member of the set consisting of bi-cell detectors, quadrant detectors, and photodiode detector arrays.

22. An apparatus for measuring the position of a measurement target, the apparatus comprising:

a light source for producing a light beam and directing at least a portion of said light beam toward the measurement target as a target portion to be reflected from the measurement target as a measurement portion;

a beamsplitter suitably placed to receive said light beam and to split it into a sample portion and a main portion;

a photodetector suitably placed to receive said sample portion and detect a sample value;

an opaque plate having an aperture and suitably placed to receive said measurement portion and to pass a position portion through said aperture, such that said position portion is less in cross section than said measurement portion; and a position sensitive detector suitably placed to receive said position portion and to detect a positional value, to permit use of said sample value to normalize said positional value.

23. The apparatus of claim 22, wherein said beamsplitter is placed in said target portion of said light beam, such that said sample value represents intensity in said light beam and said normalization of said positional value is with respect to intensity.

24. The apparatus of claim 22, wherein said beamsplitter is placed in said measurement portion of said light beam, such that said sample value represents reflectivity of the measurement target and said normalization of said positional value is with respect to reflectivity.

25. An method for measuring the position of a measurement target, the method comprising the steps of:

(a) producing a light beam and directing at least a portion of said light beam toward the measurement target;

(b) splitting said light beam into an intensity sample portion and a target portion;

(c) detecting an intensity value from said intensity sample portion;

(d) passing said target portion to the measurement target and reflecting it as a measurement portion;

(e) restricting said measurement portion through an aperture to create a position portion less in cross section than said measurement portion; and (f) receiving said position portion onto a position sensitive detector for detection of a positional value, to permit use of said intensity value to normalize said positional value with respect to intensity of said light beam.

26. An method for measuring the position of a measurement target, the method comprising the steps of:

(a) producing a light beam and directing at least a portion of said light beam toward the measurement target;

(b) passing said target portion to the measurement target and reflecting it as a measurement portion;

(c) splitting said light beam into a reflectivity sample portion and a measurement portion;

(d) detecting a reflectivity value from said reflectivity sample portion;

(e) restricting said measurement portion through an aperture to create a position portion less in cross section than said measurement portion; and (f) receiving said position portion onto a position sensitive detector for detection of a positional value, to permit use of said reflectivity value to normalize said positional value with respect to reflectivity of the measurement target.

* * * * *